G. B. RUNDLETT.
Machines for Planing the Edges of Sheet-Metal.
No. 145,593. Patented Dec. 16, 1873.

Witnesses.
S. N. Piper.
L. N. Mollier

Greenleaf B. Rundlett.
by his attorney
R. H. Eddy

UNITED STATES PATENT OFFICE.

GREENLEAF B. RUNDLETT, OF SOUTH NEW MARKET, NEW HAMPSHIRE, ASSIGNOR TO SWAMSCOT MACHINE COMPANY, OF SAME PLACE.

IMPROVEMENT IN MACHINES FOR PLANING THE EDGES OF SHEET METAL.

Specification forming part of Letters Patent No. 145,593, dated December 16, 1873; application filed November 13, 1873.

*To all whom it may concern:*

Be it known that I, GREENLEAF B. RUNDLETT, of South New Market, of the county of Rockingham and State of New Hampshire, have invented a new and useful Improvement in Machinery for Planing the Edges of Metallic Plates; and do hereby declare the same to be fully described in the following specification and represented in the accompanying drawings, of which—

Figure 1:
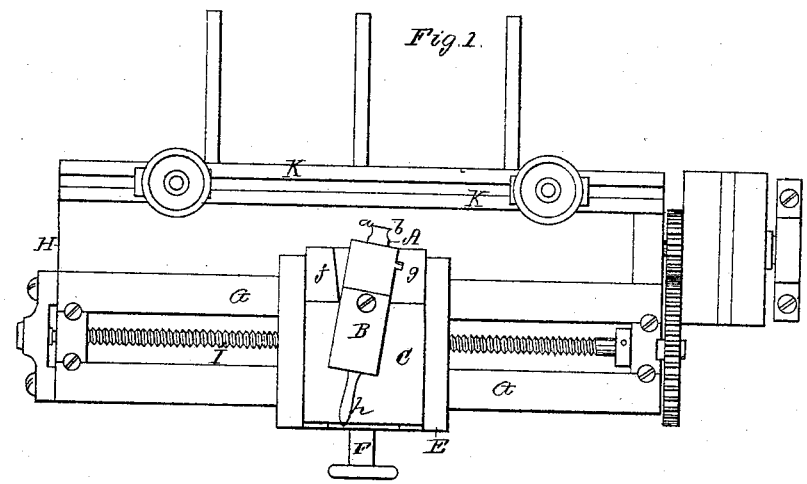
Figure 2:
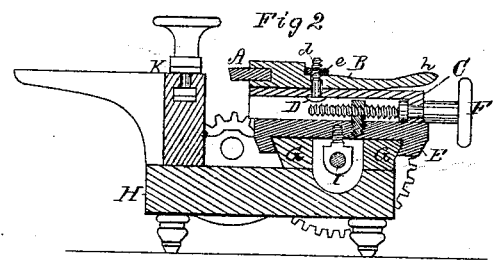
Figure 3:
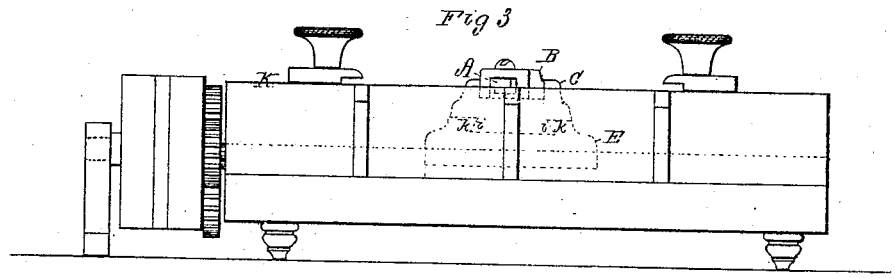

Figure 1 denotes a top view, Fig. 2 a transverse section, and Fig. 3 a rear elevation, of an edge-planing machine provided with my improvement, such improvement consisting, mainly, in a double-edged cutter, a vibratory cutter-carrier, and a support-piece for the latter provided with lips or stops, to limit the extent of movement in either direction of the cutter-carrier, all being for the purpose of enabling the cutter, while moved in either direction, to the right or left, to cut a plate, and to be properly and easily adjusted therefor.

Figure 4:
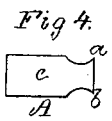
Figure 5:
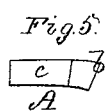

Figure 4 is a top view, and Fig. 5 a side view, of the double-edged cutter A, it having two cutting-edges, $a\ b$, projecting from its shank or body $c$, in manner as represented. This cutter A is placed in and projects from a carrier, B, resting upon and pivoted to a support-piece or carriage, C, the pivot or center-pin upon which the carrier B turns being shown at D as extended from the carrier C up through the carrier B, and provided with a screw, $d$, and nut $e$, for clamping the carrier down upon the carriage. Furthermore, the carrier is placed between two stops or abutments, $f\ g$, erected upon the carriage, and at suitable distances apart.

On the carrier being turned against one of the said abutments, the cutter will be brought into position for one of its edges to cut while such cutter may be in the act of being moved in one direction along a plate. By turning the carrier away from the said abutment and up against the other of the two, the cutter will be carried into position for its other cutting-edge to act, while the cutter is next being moved in an opposite direction along the plate.

A handle, $h$, projecting from the cutter-carrier, as shown, enables such carrier to be turned on its pivot horizontally by manual power, and from one stop or abutment to the other, as occasion may require. In general, however, this manipulation of the carrier will not be necessary, as such movements of it will be automatic, or be carried by the cutter when brought into action on the sheet or plate.

The carriage C is supported upon another carriage, E, the two being provided with guides $i\ i\ k\ k$, for directing the first carriage in a direction at right angles to the edge of the plate rectilinearly toward and away from the plate to be cut. A screw, F, suitably applied to the two carriages, serves to effect the said rectilinear movements of the carriage C. The carriage E is supported on a rail, G, projecting from the main frame H of the machine, such rail being so arranged as to guide the carriage E in a direction parallel to the edge of the plate while such carriage may be in movement. A long screw, I, suitably arranged in the frame H and applied to the carriage E, serves to effect the movements of the said carriage. The plate, while being reduced or trimmed at or on its edge, is to be supported and fixed upon sustaining rails or ways K K, arranged as shown, it being clamped to them by screws and nuts or other suitable devices.

With this machine, it will be seen that the cutter may be made to cut the plate in whichever of the two ways the carriage E may be moved on and lengthwise of its supporting-rail.

What, therefore, I claim in the metallic-plate-edge-planing machine is—

The double-edged cutter A, the stops or abutments $f\ g$, and the vibratory cutter-carrier B, arranged and combined, essentially as set forth, with the carriages C and E, applied together and to the frame H in manner and to operate substantially as specified.

GREENLEAF B. RUNDLETT.

Witnesses:
R. H. EDDY,
J. R. SNOW.